(12) United States Patent
Ham

(10) Patent No.: US 7,393,397 B2
(45) Date of Patent: Jul. 1, 2008

(54) INK COMPOSITION, INK CARTRIDGE AND INKJET RECORDING APPARATUS INCLUDING THE SAME

(75) Inventor: Cheol Ham, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/277,669

(22) Filed: Mar. 28, 2006

(65) Prior Publication Data

US 2006/0262173 A1 Nov. 23, 2006

(30) Foreign Application Priority Data

May 18, 2005 (KR) .................. 10-2005-0041767

(51) Int. Cl.
C09D 11/00 (2006.01)
C09D 11/02 (2006.01)
B41J 2/01 (2006.01)

(52) U.S. Cl. ............... 106/31.27; 106/31.58; 106/31.6; 106/31.86; 106/31.9; 347/100

(58) Field of Classification Search .............. 106/31.27, 106/31.6, 31.9, 31.58, 31.86; 347/100
See application file for complete search history.

(56) References Cited

U.S. PATENT DOCUMENTS

| 5,723,514 | A  | * | 3/1998 | Nachfolger et al. | ......... 523/161 |
| 6,294,011 | B1 | * | 9/2001 | Hedouin et al. | ............. 106/439 |
| 6,527,843 | B1 | * | 3/2003 | Zaima et al. | ............. 106/31.33 |
| 6,899,756 | B2 | * | 5/2005 | Nomura et al. | ............. 106/310 |
| 6,905,520 | B2 | * | 6/2005 | Auger | ........................... 8/402 |
| 2005/0038136 | A1 | * | 2/2005 | Horie et al. | ................ 523/160 |
| 2006/0011096 | A1 | * | 1/2006 | Sakasai | ................... 106/31.27 |
| 2006/0042509 | A1 | * | 3/2006 | Henglein et al. | ........... 106/415 |
| 2006/0137567 | A1 | * | 6/2006 | Yadav | ...................... 106/31.9 |

FOREIGN PATENT DOCUMENTS

| JP | 6-107995 | 4/1994 |
| JP | 06-107996 | 4/1994 |
| JP | 2003-201424 | 7/2003 |
| JP | 2004-256623 | 9/2004 |
| KR | 2001-5778 | 1/2001 |
| KR | 2001-95281 | 11/2001 |

OTHER PUBLICATIONS

Korean Office Action dated Aug. 28, 2006 issued in KR 2005-41767.

* cited by examiner

*Primary Examiner*—Helene Klemanski
(74) *Attorney, Agent, or Firm*—Stanzione & Kim, LLP

(57) ABSTRACT

An ink composition for inkjet printer including a cerium salt compound, a colorant and water; an ink cartridge including the same; and an inkjet recording apparatus including the ink cartridge. In the ink composition, the cerium salt can suppress the occurrence of kogation and properly eject ink droplets over a long period of time by forming a film on the surface of an exothermal device in a thermal type inkjet recording head.

19 Claims, 2 Drawing Sheets

INK COMPOSITION, INK CARTRIDGE AND INKJET RECORDING APPARATUS INCLUDING THE SAME

CROSS-REFERENCE TO RELATED APPLICATIONS

This application claims the benefit of Korean Patent Application No. 10-2005-0041767, filed on May 18, 2005, in the Korean Intellectual Property Office, which is incorporated herein in its entirety by reference.

BACKGROUND OF THE INVENTION

1. Field of the Invention

The present general inventive concept relates to an ink composition, and an ink cartridge and an inkjet recording apparatus including the same, and more particularly, to an ink composition for inkjet recording that can suppress the occurrence of kogation, which is a problem in a thermal type inkjet printer, and an ink cartridge and an inkjet recording apparatus including the same.

2. Description of the Related Art

In inkjet printing, characters and images are recorded through the formation of a point called a "dot" by ejecting ink droplets from a nozzle in a recording head of an inkjet printer onto a recording medium, such as a sheet. An ink composition used in the inkjet printing is prepared by dissolving or dispersing an aqueous dye or pigment in a solvent, such as water.

An inkjet printer can be categorized into a piezoelectric type printer that ejects ink using a piezoelectric device, and a thermal type printer that ejects ink using an exothermal device.

According to a thermal printing method, ink contained in an ink container of an inkjet recording head is locally heated by an exothermal device to form bubbles, and ink droplets in the ink container are ejected onto a recording medium through an orifice, such as a nozzle. Accordingly, the thermal type printer has an inkjet recording head including an exothermal device that is positioned in the ink container to heat the ink, and a driving circuit, such as a logic integrated circuit, that drives the exothermal device.

Further, an exothermal device is prepared by forming a layer of a resistance material, such as tantalum, tantal aluminum and titanium nitride, on a substrate, forming an Al electrode thereon, and then forming a passivation layer, such as silicon nitride film, thereon. Usually, a nozzle having a diameter of 10 to 40 μm must not be occluded by the ink, the surface of the exothermal device must not be damaged during repeated ejecting, and the performance of an ink pen must not be deteriorated.

Currently, tantalum that is stiff, and thus is strong against physical damage and has excellent chemical resistance, is widely used. In spite of such properties of tantalum, the passivation layer may be eroded after hundreds of millions to even tens of billions of repeated ejecting. When conventional ink used in inkjet recording is used in a thermal inkjet printer, impurities, such as a metal ion incorporated upon synthesizing a dye, or a foreign substance, such as a thermal degradation product of a dye, is deposited on the surface of the exothermal device due to use of the inkjet printer. Such a phenomenon is referred to as "kogation." When kogation occurs, local heating of ink becomes insufficient, and thus bubbling is suppressed, the speed of ejecting ink become slow, and ejecting ink droplets is affected.

The passivation layer of an exothermal device may be damaged by cavitation in addition to the kogation problem. Such damage makes fine holes on the surface of the resistance material layer, thereby shortening the lifetime of the resistance material layer. Hundreds of millions of ejections may erode the passivation layer due to the oxidation of the ink in a vacuum, at high temperatures, and/or in chemical reactions. The erosion of the passivation layer may damage an electric insulating layer, thus shortening a circuit supplying electricity to the resistance material, or may decrease the thermal conductivity of the resistance material, thereby deteriorating the stability of an ejecting speed.

Minimizing the change in the ejecting speed per nozzle or between nozzles is important in correctly positioning a point on a paper substrate. An error in the position of a point deteriorates image quality. An error in the position of a point becomes more distinct as the volume of the ink droplets decreases.

The market for inkjet printers requires small droplets having higher resolution and a printer head having a longer lifetime. The printer head having a longer lifetime reduces costs and inventory control needs. However, when ink droplets are small, more ink ejection is carried out by the printer, and thus the damage of passivation layer may worsen. Reducing the damage by increasing the thickness of the passivation layer requires more energy for ejection, which is undesirable for inkjet printers.

One technique proposed to prevent kogation is to remove impurities, such as metal ions incorporated upon the synthesis of a dye, from the dye. However, the thermal degradation of the dye in the ink is unavoidable. Thus, though the impurities such as metal ions are removed by purification of the ink, it is inevitable that degradation products of the dye are deposited on an exothermal device. Accordingly, such proposed techniques cannot prevent kogation completely, and other known methods are also limiting in effect and have other adverse side effects.

As described above, as long as an ink comprising a dye, water and an organic solvent is used in inkjet recording, the occurrence of kogation cannot be prevented completely by the prior art.

SUMMARY OF THE INVENTION

The present general inventive concept provides an ink composition for inkjet recording that can suppress the occurrence of kogation in thermal type inkjet printing, thereby allowing a printer to properly eject ink droplets from a printer head over a long period of time; an ink cartridge including the same; and an inkjet recording apparatus including the ink cartridge.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept can be achieved by providing an ink composition for inkjet recording comprising a colorant, water and a cerium salt.

The foregoing and/or other aspects and utilities of the present general inventive concept can also be achieved by providing an ink cartridge including the ink composition.

The foregoing and/or other aspects and utilities of the present general inventive concept can also be achieved by providing an inkjet recording apparatus including the ink cartridge.

The foregoing and/or other aspects and utilities of the present general inventive concept can also be achieved by providing an ink composition for inkjet recording comprising a colorant, a liquid vehicle, a cerium compound, and at least one surfactant.

The foregoing and/or other aspects and utilities of the present general inventive concept can also be achieved by providing an inkjet recording device comprising a passivation layer and a cerium compound film formed on the passivation layer.

The foregoing and/or other aspects and utilities of the present general inventive concept can also be achieved by providing a method of making an ink composition, the method comprising uniformly mixing a colorant, a liquid vehicle, a cerium compound, and at least one solvent.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
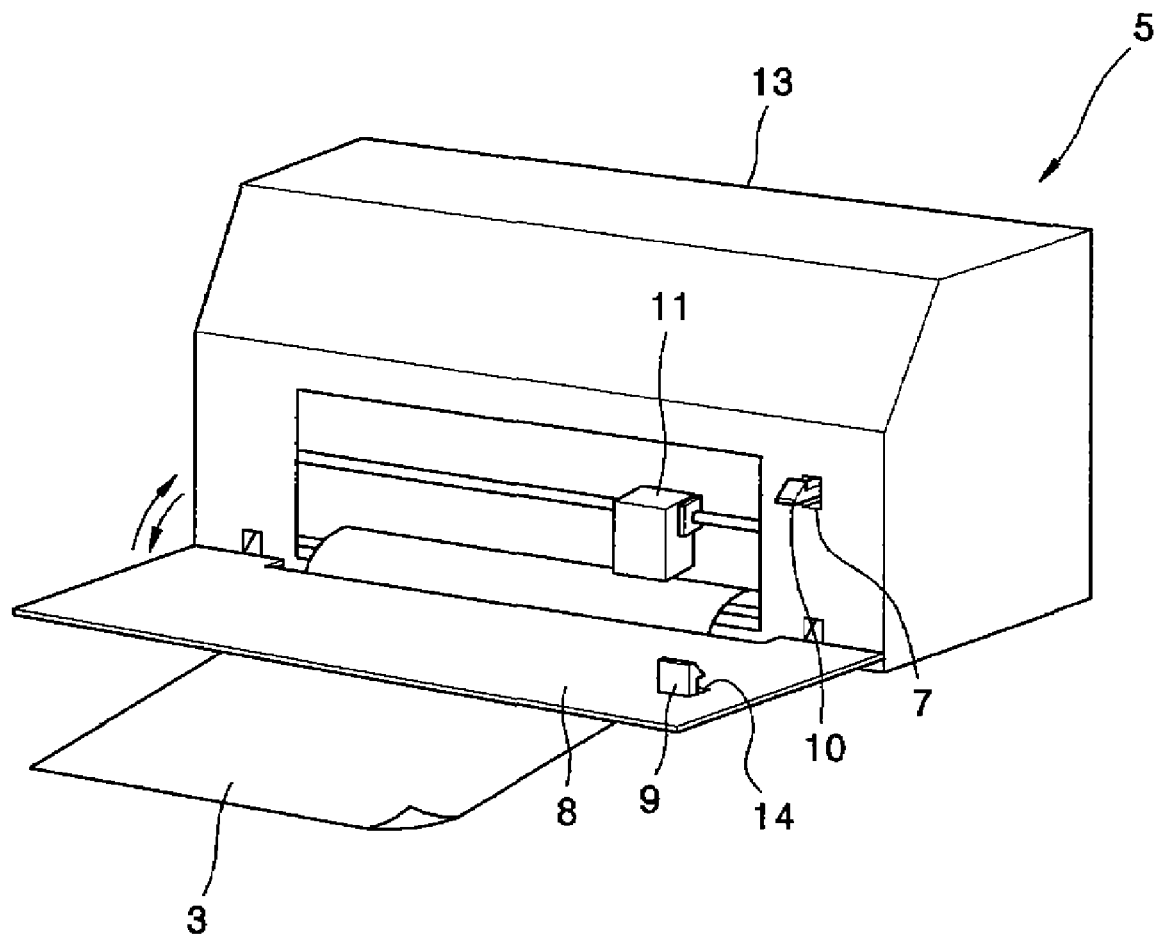
FIG. 1 is a squint-eyed view illustrating an inkjet recording apparatus including an ink cartridge comprising an ink composition for inkjet recording comprising a colorant, water and a cerium salt compound according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An ink composition according to the present general inventive concept can prevent kogation and deposition of impurities onto an exothermal device since it comprises a cerium salt compound. Accordingly, high quality recording can be achieved since ink droplets can be properly ejected onto a recording medium over a long period of time without slowing down the speed at which ink is ejected from the inkjet printer head. Particularly, the cerium salt compound is deposited on a surface of an exothermal device to form a film, and this film prevents a foreign substance, such as a degradation product of dye or an impurity, from being deposited on the surface of the exothermal device.

The cerium salt compound film is formed on the surface of a passivation layer of the exothermal device during repeated ink ejection, thereby maintaining a uniform surface for uniform temperature distribution. The film is repeatedly formed at a uniform speed by the continuous supply of cerium ions from the ink composition. The amount of heat accumulated inside of the newly formed film on the surface of the exothermal device can be minimized by thinning the passivation layer, such as by thinning a tantalum passivation layer. Further, a substance such as silicon, silicon oxide, silicon nitride or silicon carbide can be used instead of tantalum to form the passivation layer, which will form a film on the exothermal device surface by a reaction between an ink composition and a resistor material. The cerium film formed on the surface of the exothermal device is made of one of cerium oxyhydroxide, cerium hydroxide and cerium oxide.

The amount of the cerium salt compound in the ink composition for inkjet recording may be about 0.0005 to about 0.1 parts by weight, for example, about 0.001 to about 0.05 parts by weight, based on 1 part by weight of the colorant. If the amount of the cerium salt compound is less than about 0.0005 parts by weight based on 1 part by weight of the colorant, kogation cannot be prevented completely. If the amount of the cerium salt compound exceeds about 0.1 parts by weight based on 1 part by weight of the colorant, ink may not be properly ejected from the nozzle of an inkjet head since the cerium salt compound is precipitated as a solid that occludes the nozzle.

The cerium salt suitable for use in the ink composition includes cerium(III) bromide ($CeBr_3$), cerium(III) chloride ($CeCl_3$), cerium(III) fluoride ($CeF_3$), cerium(III) iodide ($CeI_3$), cerium(III) nitrate ($Ce(NO_3)_3$), cerium(III) perchlorate ($Ce(ClO_4)_3$), cerium(III) sulfate ($Ce_2(SO_4)_3$) and mixtures thereof.

The ink composition for inkjet recording can comprise water as a solvent. In the ink composition, the amount of water may be about 5 to about 100 parts by weight based on 1 part by weight of a colorant. If the amount of water is less than about 5 parts by weight based on 1 part by weight of a colorant, the viscosity of the ink composition is increased, thereby deteriorating the ejecting performance. If the amount of water exceeds about 100 parts by weight based on 1 part by weight of a colorant, effects such as penetrability, dot forming ability and a drying property of a printed image on a recording medium (such as a usual sheet or a professional sheet) cannot be easily obtained since water controls the surface tension of ink. Although water is used above as a liquid vehicle for the ink composition, the liquid vehicle is not limited to being water. Suitable components for the liquid vehicle are known to those of ordinary skill in the art.

Further, the ink composition can further comprise an aqueous organic solvent. In the ink composition, the amount of the aqueous organic solvent may be about 0.1 to about 90 parts by weight based on 1 part by weight of a colorant. If the amount of the aqueous organic solvent is less than 0.1 parts by weight based on 1 part by weight of a colorant, effects such as penetrability, dot forming ability and a drying property of a printed image on a recording medium (such as a usual sheet or a professional sheet) cannot be easily obtained since water controls the surface tension of ink. If the amount of the aqueous organic solvent exceeds about 90 parts by weight based on 1 part by weight of a colorant, the viscosity of the ink composition is increased, thereby deteriorating the ejecting performance. If the ink composition further comprises an aqueous organic solvent, the weight ratio of water to the aqueous organic solvent is about 1:0.02 to about 1. Suitable aqueous organic solvents include, but are not limited to, an aliphatic primary alcohol, a polyhydric alcohol and a polyhydric alcoholic derivative.

The aliphatic primary alcohol can enhance penetrability, dot forming ability and drying property of a printed image on a recording medium (such as a usual sheet or a professional sheet) by controlling the surface tension of the ink composition. The polyhydric alcohol and its derivatives are not easily vaporized and lower the freezing point of the ink composition, thus enhancing the storage stability of the ink composition to prevent nozzle occlusion.

The aliphatic primary alcohol includes, but is not limited to, a $C_1$-$C_{10}$ lower alcohol such as methyl alcohol, ethyl alcohol, n-propyl alcohol, i-propyl alcohol, n-butyl alcohol, s-butyl alcohol and t-butyl alcohol. The aliphatic primary alcohol may be ethyl alcohol, i-propyl alcohol and n-butyl alcohol.

The polyhydric alcohol includes, but is not limited to, an alkyleneglycol such as ethyleneglycol, diethyleneglycol, triethyleneglycol, propyleneglycol, butyleneglycol and glycerol, a polyalkyleneglycol such as polyethyleneglycol and polypropyleneglycol, a thiodiglycol or mixture thereof.

The polyhydric alcoholic derivatives include, but are not limited to, a lower alkyl ether of the polyhydric alcohol and a lower carboxylic acid ester of the polyhydric alcohol. The lower alkyl ether of the polyhydric alcohol includes, but is not limited to, ethyleneglycol dimethyl ether, and the lower carboxylic acid ester of the polyhydric alcohol includes, but is not limited to, ethyleneglycol diacetate.

The colorant includes a self-dispersible dye, a self-dispersible pigment, and/or a conventional pigment or dye conventionally used as a dispersant. The colorant includes, but is not limited to, C.I. Basic Black 2, C.I. Direct Yellow 44, C.I. Basic Blue 26, C.I. Direct Red 227 or Projet Fast Cyan 2 (Zeneca Company), Projet Fast Magenta 2 (Zeneca Company), Projet Fast Yellow 2 (Zeneca Company), or Projet Fast Black 2 (Zeneca Company).

The ink composition for inkjet recording according to the present general inventive concept can further comprise an additive such as a surfactant, a pH controller, a preservative, a chelating agent, a viscosity controller, a wetting agent, a dispersing agent, an anti-oxidizing agent, and other agents conventionally included in an ink composition. In the ink composition, the total amount of the additive is about 0.01 to about 2 parts by weight based on 1 part by weight of a colorant.

The ink composition for inkjet recording can be prepared by uniformly mixing a dye, water and optionally an aqueous organic solvent by conventional techniques.

The ink composition can be applied to a toner composition, various paints and a coating liquid, etc., in addition to an ink composition, although its use is not particularly limited. For example, the ink composition may be usefully applied to an inkjet printer cartridge including an array head.

The throughput of a printer can be increased since the inkjet printer including an array head prints with high speed by employing many chips, unlike the shuttle-type inkjet printer that prints by employing only one chip.

The inkjet recording apparatus includes an ink cartridge comprising the ink composition described above, and a squint-eyed view of the ink recording apparatus according to an embodiment of the present general inventive concept is illustrated in FIG. 1.

As illustrated in FIG. 1, an inkjet recording apparatus according to an embodiment of the present general inventive concept includes an ink cartridge comprising an ink composition comprising a colorant, water and a cerium salt compound. A printer cover 8 is connected to a main body 13 of a printer 5 by a hinge. The engaged region of the moving latch 10 protrudes through a hole 7. A moving latch 10 engages with a fixed latch 9, and the fixed latch 9 contacts the moving latch 10 inside of the printer cover 8 when the cover 8 is closed. The cover 8 is provided with a recess 14 corresponding to the engaged region of the moving latch 10 elongated through the hole 7. An ink cartridge 11 is mounted such that ink is applied to paper 3 passing through the lower part of the ink cartridge 11.

Figure 2:
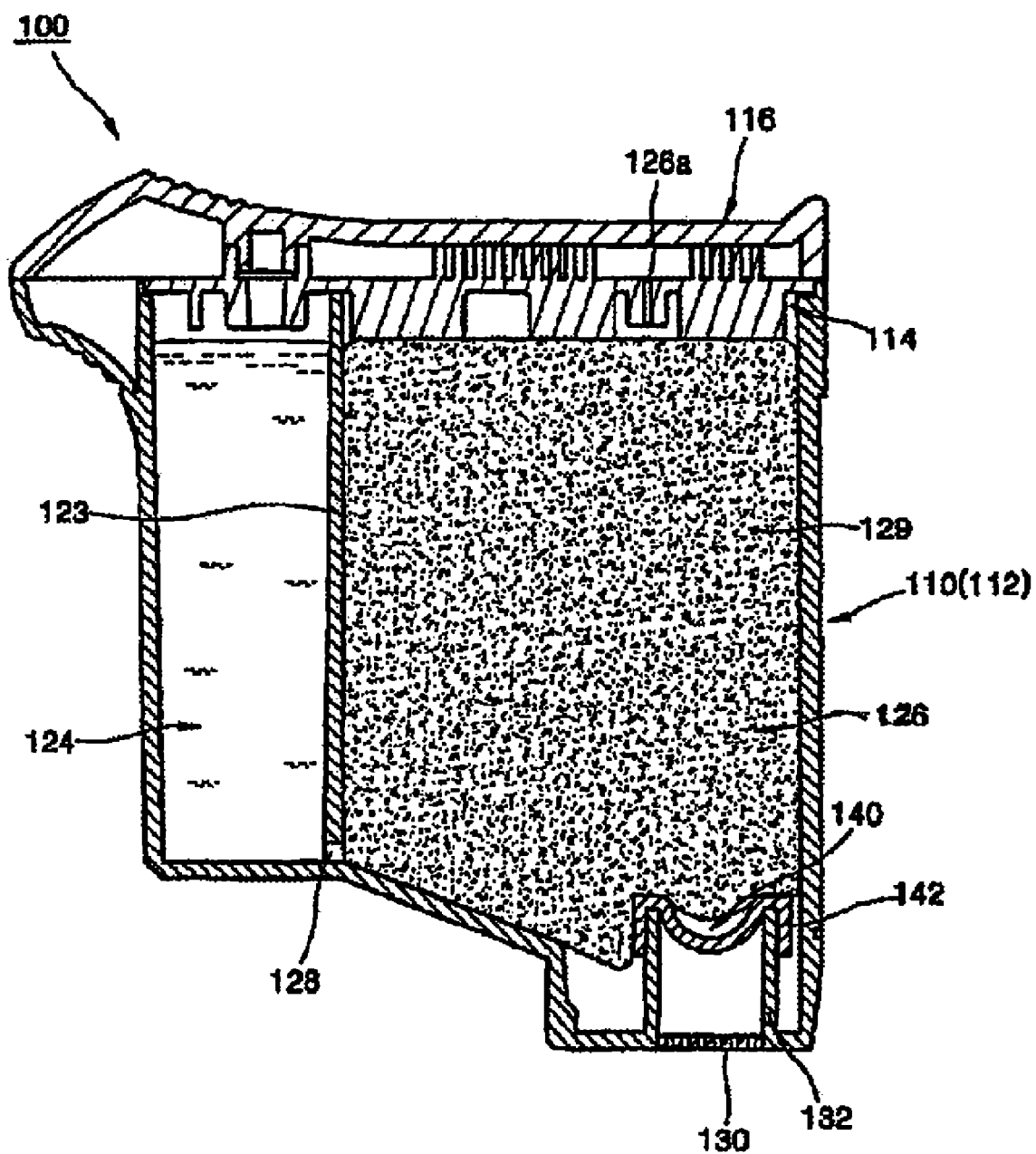
FIG. 2 is a cross-sectional view illustrating an ink cartridge comprising an ink composition for inkjet recording comprising a colorant, water and a cerium salt compound according to another embodiment of the present general inventive concept.

FIG. 2 is a cross-sectional view illustrating an ink cartridge including an ink composition for inkjet recording comprising a colorant, water and a cerium salt compound according to another embodiment of the present general inventive concept.

An ink cartridge 100 includes a cartridge main body 110 forming an ink container 112, an inner cover 114 covering the top region of the ink container 112, and an outer cover 116 spaced apart from the inner cover 114 at a predetermined interval to seal the ink container 112 and the inner cover 114.

The ink container 112 is compartmentalized into a first chamber 124 and a second chamber 126 by the vertical barrier wall 123. The ink passage 128 is formed between the first chamber 124 and the second chamber 126 on the bottom of the vertical barrier wall 123. Ink is charged into the first chamber 124, and a sponge 129 and the ink are charged into the second chamber 126. A vent hole 126a corresponding to the second chamber 126 is formed on the inner cover 114.

A filter 140 prevents the nozzle 130 of a printer head from being occluded by being formed on the lower part of the second chamber 126. The filter 140 filters impurities and minute bubbles of ink. A hook 142 is formed on the edge region of the filter 140, positioned on a top region of a standpipe 132. The ink in the ink container 112 passes through the nozzle 130 of the printer head to be ejected in a shape of small droplets on the printing medium.

The present general inventive concept will be described in greater detail with reference to the following examples. The following examples are for illustrative purposes only and are not intended to limit the scope of the present general inventive concept.

Ink compositions for inkjet recording according to Examples 1 to 4 were prepared by thoroughly mixing the components described in the Examples 1 to 4 below with a mixer.

| Example 1 | |
|---|---|
| C.I. Basic Black 2 | 4.5 parts by weight |
| Glycerol | 7.5 parts by weight |
| Diethyleneglycol | 12.0 parts by weight |
| Cerium(III) chloride | 0.005 parts by weight |
| Water (Deionized water) | 76 parts by weight |

| Example 2 | |
|---|---|
| C.I. Direct Yellow 44 | 4.0 parts by weight |
| Glycerol | 9.5 parts by weight |
| Diethyleneglycol | 5.5 parts by weight |
| Ethyleneglycol | 4.5 parts by weight |
| Cerium(III) nitrite | 0.01 parts by weight |
| Water (Deionized water) | 76.5 parts by weight |

| Example 3 | |
|---|---|
| C.I. Basic Blue 26 | 4.5 parts by weight |
| Diethyleneglycol | 9.5 parts by weight |
| Ethyleneglycol | 10.5 parts by weight |
| Cerium(III) perchlorate | 0.003 parts by weight |
| Water (Deionized water) | 75.5 parts by weight |

| Example 4 | |
|---|---|
| C.I. Direct Red 227 | 3.5 parts by weight |
| Glycerol | 10.5 parts by weight |
| Diethyleneglycol | 4.5 parts by weight |
| Ethyleneglycol | 5.5 parts by weight |
| Cerium(III) sulfate | 0.006 parts by weight |
| Water (Deionized water) | 76 parts by weight |

Ink compositions for inkjet recording according to Comparative Examples 1 to 4 were prepared by thoroughly mixing the components described in the Comparative Examples 1 to 4 below with a mixer.

| Comparative Example 1 | |
|---|---|
| C.I. Basic Black 2 | 4.5 parts by weight |
| Glycerol | 7.5 parts by weight |
| Diethyleneglycol | 12.0 parts by weight |
| Water (Deionized water) | 76 parts by weight |

-continued

Comparative Example 2

| | | |
|---|---|---|
| C.I. Direct Yellow 44 | 4.0 | parts by weight |
| Glycerol | 9.5 | parts by weight |
| Diethyleneglycol | 5.5 | parts by weight |
| Ethyleneglycol | 4.5 | parts by weight |
| Water (Deionized water) | 76.5 | parts by weight |

Comparative Example 3

| | | |
|---|---|---|
| C.I. Basic Blue 26 | 4.5 | parts by weight |
| Diethyleneglycol | 9.5 | parts by weight |
| Ethyleneglycol | 10.5 | parts by weight |
| Water (Deionized water) | 75.5 | parts by weight |

Comparative Example 4

| | | |
|---|---|---|
| C.I. Direct Red 227 | 3.5 | parts by weight |
| Glycerol | 10.5 | parts by weight |
| Diethyleneglycol | 4.5 | parts by weight |
| Ethyleneglycol | 5.5 | parts by weight |
| Water (Deionized water) | 76 | parts by weight |

Evaluation Experiment

Ink compositions according to the Examples 1 to 4 and the Comparative Examples 1 to 4 were loaded into an inkjet printer having an exothermal device, and ejected onto a conventional paper. The change in ejecting speed (decreased rate in ejecting speed (%)) was obtained by determining the ejecting speeds of the ink droplets at an initial ejecting stage and after 100,000,000 pulses. The results are shown in Table 1 below.

The surface of the exothermal device was observed after 100,000,000 pulses with an optical microscope to investigate the presence of deposited products, i.e., the status of kogation. The status at which deposited products were not substantially present on the surface of the exothermal device was evaluated as "A." The status at which deposited products were present in a small amount on the surface of the exothermal device was evaluated as "B." The status at which deposited products were present on the surface of the exothermal device in a substantial amount was evaluated as "C." The evaluation results are shown in Table 1 below.

TABLE 1

| | Decrease in ejecting speed (%) | Status of kogation |
|---|---|---|
| Example 1 | 13 | A |
| Example 2 | 9 | A |
| Example 3 | 19 | B |
| Example 4 | 7 | A |
| Comparative Example 1 | 64 | C |
| Comparative Example 2 | 72 | C |
| Comparative Example 3 | 39 | C |
| Comparative Example 4 | Not determinable | C |

As shown in Table 1, when ink compositions according to the Examples 1 to 4 comprising a cerium salt compound were used in thermal inkjet printing, the decreased rate in ejecting speed (%) after 100,000,000 pulses was less than 20%, indicating that the ink compositions are suitable for thermal inkjet printing. In the Examples 1, 2 and 4, the surface of the exothermal device was not substantially colored.

Meanwhile, when ink compositions according to the Comparative Examples 1 to 4 were used in thermal inkjet printing, the decreased rate in ejecting speed (%) exceeded 20%, indicating that those ink compositions may not be suitable for thermal inkjet printing. Particularly, the ink composition according to the Comparative Example 4 could not be ejected due to the substantial occurrence of kogation, and a large amount of deposited products were observed on the surface of the exothermal device in the printer nozzle.

The results demonstrate that when an ink composition comprising a cerium salt compound is used in a thermal inkjet printer head, kogation can be suppressed. That is, foreign substances can be prevented from being deposited on the surface of the exothermal device.

Ink compositions according to embodiments of the present general inventive concept can properly eject ink droplets from the inkjet printer head over a long period of time by suppressing the occurrence of kogation when used in thermal type inkjet recording.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An ink composition comprising a colorant, water and a cerium salt.

2. The ink composition according to claim 1, wherein an amount of the cerium salt in the ink composition is about 0.0005 to about 0.1 parts by weight based on 1 part by weight of the colorant.

3. The ink composition according to claim 1, wherein the cerium salt comprises at least one compound selected from the group consisting of cerium(III) bromide ($CeBr_3$), cerium (III) chloride ($CeCl_3$), cerium(III) fluoride ($CeF_3$), cerium (III) iodide ($CeI_3$), cerium(III) nitrate ($Ce(NO_3)_3$), cerium(III) perchlorate ($Ce(ClO_4)_3$ and cerium(III) sulfate ($Ce_2(SO_4)_3$).

4. The ink composition according to claim 1, wherein an amount of water in the ink composition is about 5 to about 100 parts by weight based on 1 part by weight of the colorant.

5. The ink composition according to claim 1, further comprising at least one aqueous organic solvent.

6. The ink composition according to claim 5, wherein the aqueous organic solvent is at least one compound selected from the group consisting of an aliphatic primary alcohol, a polyhydric alcohol and a polyhydric alcoholic derivative.

7. The ink composition according to claim 6, wherein the aliphatic primary alcohol is a $C_1$-$C_{10}$ lower alcohol.

8. The ink composition according to claim 6, wherein the polyhydric alcohol is at least one compound selected from the group consisting of an alkyleneglycol, a polyalkyleneglycol and a thiodiglycol.

9. The ink composition according to claim 6, wherein the polyhydric alcoholic derivative is at least one compound selected from the group consisting of a lower alkyl ether of the polyhydric alcohol and a lower carboxylic acid ester of the polyhydric alcohol.

10. The ink composition according to claim 1, further comprising at least one additive selected from the group consisting of a surfactant, a pH controller, a preservative, a chelating agent, a viscosity controller, a wetting agent, a dispersing agent, and an anti-oxidizing agent.

11. The ink composition according to claim 5, wherein an amount of the aqueous organic solvent in the ink composition is about 0.1 to about 90 parts by weight based on 1 part by weight of the colorant.

12. An ink cartridge comprising the ink composition according to claim 1.

13. An inkjet recording apparatus comprising the ink cartridge according to claim 12.

14. An ink composition comprising a colorant, a liquid vehicle, a cerium compound, and at least one surfactant, wherein the cerium compound comprises a cerium salt.

15. The ink composition according to claim 14, wherein the cerium salt comprises at least one salt selected from the group consisting of cerium(III) bromide ($CeBr_3$), cerium(III) chloride ($CeCl_3$), cerium(III) fluoride ($CeF_3$), cerium(III) iodide ($CeI_3$), cerium(III) nitrate ($Ce(NO_3)_3$), cerium(III) perchlorate ($Ce(ClO_4)_3$) and cerium(III) sulfate ($Ce_2(SO_4)_3$).

16. The ink composition according to claim 14, wherein the liquid vehicle comprises water.

17. The ink composition according to claim 14, further comprising at least one organic solvent.

18. An inkjet recording device comprising a passivation layer and a cerium compound film formed on the passivation layer.

19. A method of making an ink composition, the method comprising uniformly mixing a colorant, an aqueous liquid vehicle, a cerium salt, and at least one solvent.

* * * * *